(12) United States Patent
Dante et al.

(10) Patent No.: US 10,359,789 B2
(45) Date of Patent: Jul. 23, 2019

(54) PRESSURE REGULATION VALVE

(71) Applicant: Microtecnica S.r.l., Turin (IT)

(72) Inventors: Giorgio Dante, Turin (IT); Dario Savino, Palazzolo (IT); Giuseppe Musso, Turin (IT)

(73) Assignee: MICROTECNICA S.R.L., Turin (IT)

( * ) Notice: Subject to any disclaimer, the term of this patent is extended or adjusted under 35 U.S.C. 154(b) by 0 days.

(21) Appl. No.: 15/598,543

(22) Filed: May 18, 2017

(65) Prior Publication Data

US 2017/0336812 A1    Nov. 23, 2017

(30) Foreign Application Priority Data

May 18, 2016   (EP) .................................... 16170233

(51) Int. Cl.
| F16K 31/12 | (2006.01) |
| F05D 16/10 | (2006.01) |
| F02C 7/047 | (2006.01) |
| F02C 9/16 | (2006.01) |
| F16K 17/04 | (2006.01) |

(Continued)

(52) U.S. Cl.
CPC .......... G05D 16/106 (2013.01); F02C 7/047 (2013.01); F02C 9/16 (2013.01); F16K 3/265 (2013.01); F16K 17/048 (2013.01); F16K 31/124 (2013.01); G05D 16/2033 (2013.01); G05D 16/2097 (2019.01); F05D 2220/323 (2013.01); F16K 31/402 (2013.01)

(58) Field of Classification Search
CPC ......... Y10T 137/7761; Y10T 137/7794; Y10T 137/7796

USPC ................................ 251/30.01, 30.02, 30.05
See application file for complete search history.

(56) References Cited

U.S. PATENT DOCUMENTS 2,882,006 A * 4/1959 Reinecke ............... A01G 25/16
                                                              251/26
2,938,537 A * 5/1960 Silver ..................... F16K 31/42
                                                              137/489

(Continued)

FOREIGN PATENT DOCUMENTS

| DE | 2007256 A1 | 9/1970 |
| GB | 885821 A | 12/1961 |
| GB | 973192 A | 10/1964 |

OTHER PUBLICATIONS

Extended European Search Report for European Application No. EP 16170233.7 dated Oct. 10, 2016, 8 pages.

*Primary Examiner* — Robert K Arundale
(74) *Attorney, Agent, or Firm* — Cantor Colburn LLP

(57) ABSTRACT

A pneumatic pressure regulation valve comprising: a valve inlet; a valve outlet; a piston arranged to control gas flow from the inlet to the outlet; a sense line fluidly connecting the inlet to a pressure regulation chamber and with a pressure relief valve connected thereto to limit the pressure in the pressure regulation chamber; wherein the piston is arranged between the pressure regulation chamber and the valve outlet such that the position of the piston is determined by the relative pressures in the regulation chamber and the valve outlet and the position of the piston controls the flow from the valve inlet to the valve outlet; wherein the sense line comprises a flow restriction upstream of the pressure relief valve. The flow restriction addresses instability that can arise from large volumes of connecting tubes or pipes in the sense line.

13 Claims, 3 Drawing Sheets

(51) Int. Cl.
    *G05D 16/20*     (2006.01)
    *F16K 31/124*     (2006.01)
    *F16K 3/26*     (2006.01)
    *F16K 31/40*     (2006.01)

(56) References Cited

U.S. PATENT DOCUMENTS

| | | | | |
|---|---|---|---|---|
| 3,282,552 | A | * | 11/1966 | Sommese, Sr. ........... B66B 1/24 251/26 |
| 3,476,353 | A | * | 11/1969 | Stampfli ............... F16K 31/402 251/30.02 |
| 3,734,120 | A | | 5/1973 | Rowe et al. |
| 3,980,002 | A | * | 9/1976 | Jarman .................. F15B 13/02 251/30.05 |
| 4,936,541 | A | * | 6/1990 | Oksanen ............... F16K 31/406 251/30.04 |
| 5,301,919 | A | * | 4/1994 | May ...................... A01G 25/16 251/30.02 |
| 6,695,005 | B2 | | 2/2004 | Ottestad |
| 2008/0000531 | A1 | | 1/2008 | Robb et al. |
| 2015/0027568 | A1 | | 1/2015 | Franzen |
| 2015/0338857 | A1 | | 11/2015 | Franzen |

\* cited by examiner

PRESSURE REGULATION VALVE

FOREIGN PRIORITY

This application claims priority to European Patent Application No. 16170233.7 filed May 18, 2016 the entire contents of which is incorporated herein by reference.

TECHNICAL FIELD

This disclosure relates to pressure regulation valves, particularly pneumatic pressure regulation valves. Such valves are often used in aerospace applications such as in hot air-based de-icing systems for gas turbine engines, although they also have applications in many other fields.

BACKGROUND

In line pressure regulator shut-off valves (PRSOV) are flow control devices with an internal closed control loop to allow control of the output pressure (p_out), in principle regardless of the upstream inlet pressure (p_in). Output pressure control is generally performed by a regulation piston which senses two different pressures on its faces: the outlet downstream pressure (p_out) and the regulation chamber pressure (p_reg). Any imbalance of these forces causes piston movement which in turn alters the flow from inlet to output and therefore redresses the imbalance in forces. In other words the piston position is self-adjusted in order to have p_out=p_reg.

The regulation pressure p_reg is typically maintained by a pressure relief valve that vents any overpressure.

The stability, i.e. the absence of oscillations of such regulation devices is highly dependent on the regulation chamber volume: the higher the volume, the more unstable the valve. Instability of the valve results in high frequency oscillations of the valve piston, which in turn leads to accelerated wearing of both the seals and the piston bore.

Such valves typically have a shut off function which is effected by venting the regulation chamber to low pressure. This may be achieved by opening a solenoid valve on a pneumatic line in communication with the regulation chamber. When the PRSOV shut off function is performed by a remotely installed solenoid, pneumatically linked to the control chamber by means of a sense-line, the stability margin can be insufficient, resulting in an unacceptable risk of unstable valve operation.

SUMMARY

According to this disclosure there is provided a pneumatic pressure regulation valve comprising: a valve inlet; a valve outlet; a piston arranged to control gas flow from the inlet to the outlet; a sense line fluidly connecting the inlet to a pressure regulation chamber and with a pressure relief valve connected thereto to limit the pressure in the pressure regulation chamber; wherein the piston is arranged between the pressure regulation chamber and the valve outlet such that the position of the piston is determined by the relative pressures in the regulation chamber and the valve outlet and the position of the piston controls the flow from the valve inlet to the valve outlet; wherein the sense line comprises a flow restriction upstream of the pressure relief valve.

The flow restriction addresses the instability issues that can arise for example from relatively large volumes of connecting tubes or pipes in the sense line. When the volume of the sense line pipework is large (e.g. relative to the regulation chamber volume) instability can arise in the feedback loop that regulates the output pressure. The high frequency oscillations of the valve piston that arise from such instability accelerate wear of the seals and the piston bore. Large volumes of sense line may arise in certain applications where control elements must be remote from the valve, for example in hot air based de-icing systems for an aircraft engine (e.g. for the nacelle lip of a gas turbine engine). The flow restriction decouples the large volume of the sense line and associated pipework from the main volume of the regulation chamber such that it does not cause instability. By locating the flow restriction upstream of the relief valve it does not interfere with the pressure communication between the regulation chamber and the relief valve and therefore does not interfere with the pressure regulation which could result in a reduction in the expected output pressure of the regulation valve. Thus the relief valve and the pressure regulation chamber are kept pneumatically linked without any flow restriction between them.

Preferably the flow restriction is sufficiently small that it decouples the regulation chamber volume from the majority of the sense line volume (including associated or attached pipework). This decoupling means that volume changes due to movement of the piston may be considered in relation to the smaller volume up to the restriction (and will thus be a higher fractional volume change) rather than in relation to the whole volume of the sense line (which would be a smaller fractional volume change). This means that piston movement results in a greater pressure increase in the regulation chamber and the line up to the pressure relief valve. Specifically any piston movement is associated with a transient pressure variation that damps out any insurgent oscillation phenomenon (indeed the pressure force associated with the pressure variation resulting from the piston movement, either an increase or decrease, is always acting in the opposite direction with respect to the initial movement). Because of the added flow restriction, the smaller volume of the regulation chamber provides a greater pressure variation, thus an enhanced damping capability.

The restriction is preferably large enough to allow efficient venting of the regulation chamber for shutoff of the regulation valve and small enough to decouple the large volume of the sense line from the regulation chamber volume. The restriction is preferably arranged close to (e.g. adjacent to) the relief valve to maximize the volume that is decoupled while maintaining correct operation of the regulation valve.

Preferably the flow restriction is sufficiently large that it allows rapid venting of the regulation chamber, e.g. in the case of a shut-off command. This is typically implemented by a valve (operated e.g. via solenoid) connected to the sense line upstream of the flow restriction. When this valve is opened, it connects the regulation chamber to low pressure resulting in the regulation chamber being emptied rapidly. The higher outlet pressure then immediately closes the valve, shutting off the flow from the inlet. If the valve is to be shut off in this way, it is desirable that the restriction not inhibit the venting of the regulation chamber and therefore too small a flow restriction should be avoided.

It should be noted that while in this position a manual override control can be used to re-open the valve partially or fully as desired.

The cross-sectional area of the flow restriction is preferably smaller than the cross-sectional area of the sense line upstream of the restriction. The flow restriction and sense line are typically of circular cross-section and therefore preferably the diameter of the flow restriction is smaller than the diameter of the sense line upstream of the restriction. In alternative arrangements the diameter of the whole sense line upstream of the relief valve could be reduced (i.e. the sense line would essentially be the flow restriction). However, it is more convenient to provide a more localized restriction as this will provide less flow resistance and also allows retro-fitting of the restriction without replacement of existing parts (or allows existing parts to be used in new installations without much modification simply by connecting the restriction in between the sense line and the rest of the valve components.

As discussed above, fluid communication between the pressure regulation chamber and the pressure relief valve is important and therefore the flow path connecting these has sufficient cross-sectional area as not to impede that communication. However a similar level of fluid communication with the pipework of the sense line and beyond is undesirable and therefore preferably the cross-sectional area of the flow restriction orifice is smaller than the cross-sectional area of the flow path between the pressure relief valve and the regulation chamber.

The sense line connects to the main fluid inlet path so as to communicate fluid at the input pressure to the regulation chamber (limited by the pressure relief valve that vents excess pressure). The orifice of this connection is small to restrict the amount of inlet fluid diverted into the sense line. This feeding orifice must be sufficiently large to allow enough fluid flow to accommodate losses through the various seals (e.g. the seals between the piston and the piston bore). However it is otherwise minimised to reduce the pressure loss from the inlet flow (particularly as this orifice will in many arrangements allow continuous flow from the inlet when the shut off valve is open, venting the regulation chamber. Preferably the orifice of the flow restriction is larger than the orifice that connects the sense line to the inlet so that it does not further restrict the flow from the inlet to the regulation chamber.

The optimal size of the flow restriction will depend on the particular installation. In particular, it will be dependent on the sizes of the other pipework and other orifices (such as the feeding orifice connecting to the inlet) in the system as well as the expected pressures and temperatures at which the system is expected to operate. However, in some examples the diameter of the flow restriction may be greater than 25% of the diameter of the sense line. In some examples the diameter of the flow restriction may be less than 75% of the diameter of the sense line. These dimensions are based on pipes and orifices with circular cross-section. In other examples, the flow restriction may be greater than 5% of the area of the sense line and/or less than 60% of the area of the sense line, more preferably greater than 10% and/or less than 50% of the area of the sense line.

As discussed above, this disclosure is particularly applicable to installations where the volume of the sense line is greater than the volume of the regulation chamber. In some examples remote controls such as a shut off valve as discussed above have to be located at a significant distance from the regulation valve and therefore the volume of the sense line may be significantly greater than the volume of the regulation chamber. This disclosure is particularly applicable to such arrangements, especially those where the volume of the sense line is at least twice the volume of the regulation chamber, in some examples at least five times as large as the volume of the regulation chamber. For example the volume of the regulation chamber may be of the order of 10 cubic centimetres and the volume of the sense line may be 200-300 cubic centimetres.

As discussed the pressure regulation valve may further comprise a valve upstream of the flow restriction which, when opened, vents the regulation chamber through the sense line. Such a valve adds significant volumes of pipework connected to the sense line as it is typically located at a significant distance from the regulation valve. This may particularly be the case for regulation valves used in aircraft engines such as a de-icing system for an aircraft engine where the shut off valve is preferably located at a distance from the engine, but the regulation valve is in the engine structure for diverting hot air from the engine for de-icing. Therefore this disclosure extends to a de-icing system for an aircraft engine comprising a pressure regulation valve as discussed above.

Another issue that can cause instability of pressure regulation valves is the use of two or more such valves in series. Such arrangements may be used for providing redundancy as is often required in aircraft systems so that reliable system operation can still be effected in the event of failure of one valve. The presence of two regulation valves means two separate regulation chambers each with its own sense line (and solenoid operated shut-off valve). Therefore this disclosure extends to a de-icing system for an aircraft engine comprising two or more pressure regulation valves as described above, connected in series. The series connection may be effected by connecting the outlet of the first regulation valve to the inlet of the second regulation valve. The sense lines for both first and second valves are preferably connected to the inlet upstream of the first (i.e. upstream) valve.

This disclosure also extends to an aircraft engine comprising a de-icing system as discussed above. The de-icing system may take hot air from the engine and direct it through the one or more regulation valves to the nacelle lip.

According to another aspect, this disclosure provides a method of regulating pneumatic pressure at an outlet comprising: diverting a portion of gas from an inlet through a sense line and past a pressure relief valve to a regulation chamber; providing a piston between the pressure regulation chamber and the outlet such that the position of the piston is determined by the relative pressures in the regulation chamber and the outlet and the position of the piston controls gas flow from the inlet to the outlet; wherein the sense line comprises a flow restriction upstream of the pressure relief valve.

It will be appreciated that all of the preferred and optional features described above in relation to the apparatus and system apply equally to the method of operation.

BRIEF DESCRIPTION OF DRAWINGS

One or more non-limiting examples will now be described, by way of example only, and with reference to the accompanying figures in which:

A typical pneumatic pressure regulation and shut-off valve 1 is shown in FIG. 1. Gas (e.g. air) arrives at the main air inlet 2 and is directed round through outer chamber 3 to one or more apertures 4 in the piston bore 5. The degree of opening of aperture 4 is determined by the position of piston 6 which is slidably mounted within bore 5. FIG. 1 shows the piston 6 fully closing the aperture 4. The piston 6 also has apertures 7 formed therein that, depending on the piston position, can communicate to some extent with apertures 4 by overlapping therewith so as to permit fluid flow from the inlet 2 through the apertures 4, 7 to the interior of the piston 6 and from there to the outlet 8.

Figure 1:
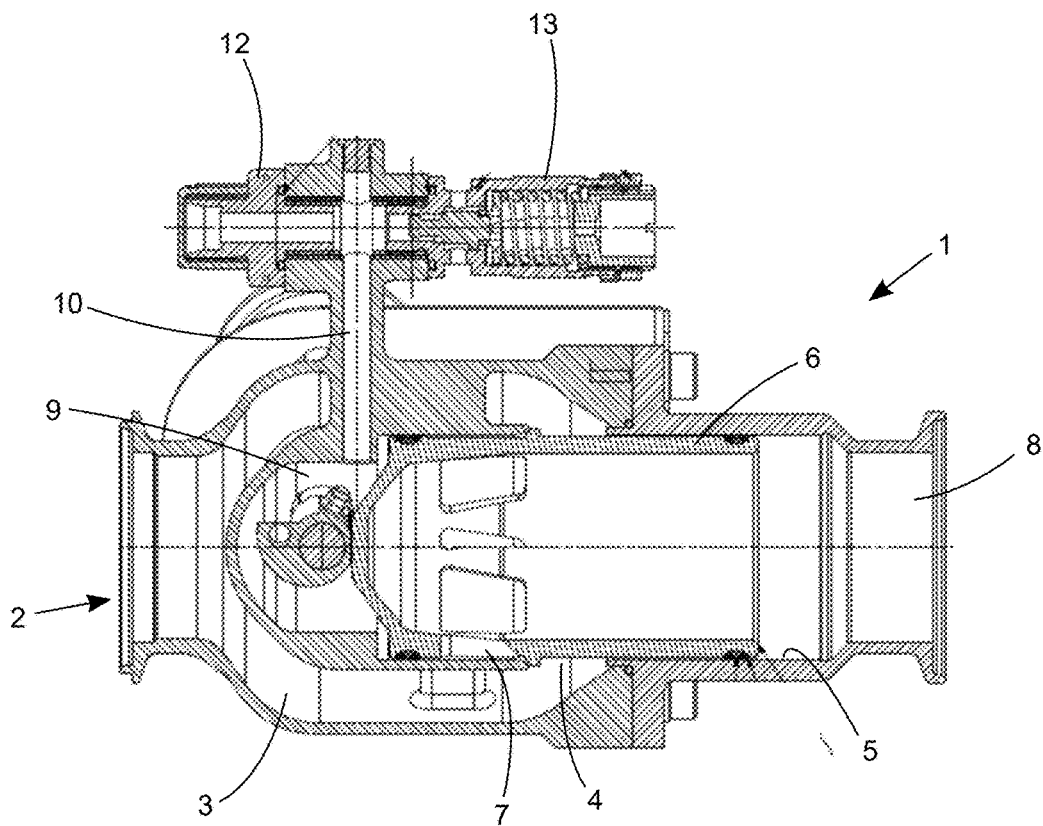
FIG. 1 shows a cross-section through a typical pressure regulation and shut off valve.

As the piston 6 is open towards the outlet, the pressure at the outlet 8 acts on the interior of the closed end of the piston 6 (the left hand side of the piston 6 is depicted in FIG. 1). This outlet pressure is countered by the pressure in regulation chamber 9 which is located on the other side of the closed piston face, i.e. to the left of piston 6 as depicted in FIG. 1. Gas is fed to the regulation chamber 9 via internal conduit 10 which in turn is supplied via sense line 11 (not shown in FIG. 1) attached at sense line connector 12. Attached to this flow path between the sense line connector 12 and the internal conduit 10 is a pressure relief valve 13. The pressure relief valve 13 defines the maximum pressure that can be reached in this system. The pressure relief valve 13 is set at a desired pressure set point that determines this maximum pressure. In the case of aircraft de-icing systems such as described below, the set point is set upon installation or calibration and is typically not then adjusted for the remainder of the equipment service life. However in other applications the set point may be changed if desired. Whenever the pressure experienced at the pressure relief valve 13 rises above the set point, the relief valve 13 opens to vent gas until the pressure has reduced below the set point, thus limiting the pressure within the system.

Figure 5:
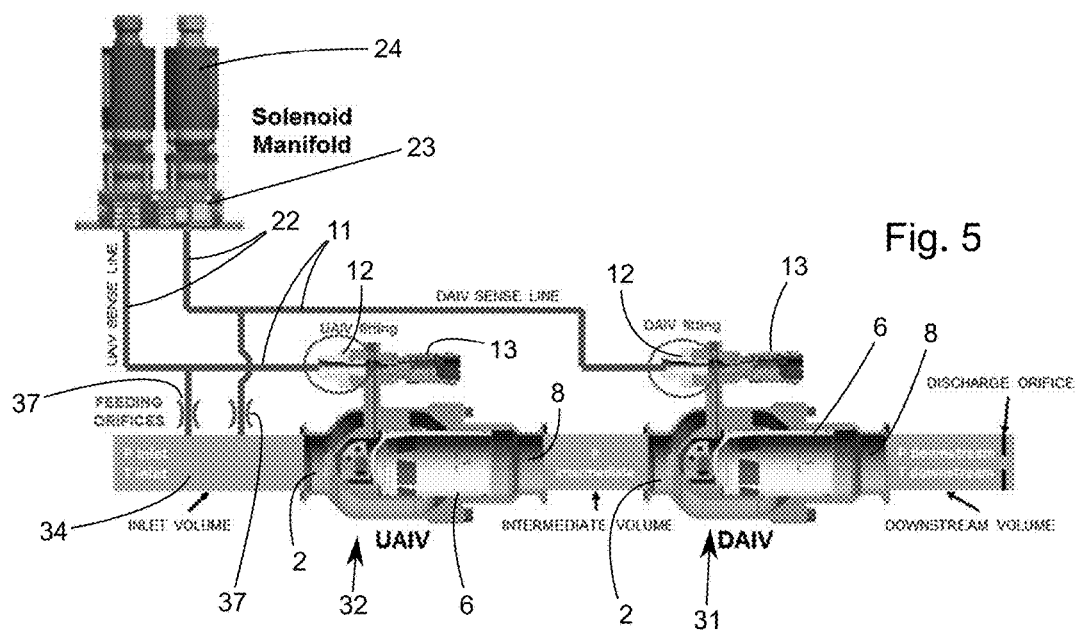
FIG. 5 schematically shows the arrangement of FIG. 4

As is illustrated in FIG. 5, the sense line 11 is fed with gas from the inlet 2 via a feeding orifice 14. Therefore the pressure within the regulation chamber 9 is expected to be equal to the pressure in the inlet 2 (subject to some pressure reduction due to frictional losses) or the pressure set point of the relief valve 13, whichever is lower. In normal operation this is expected to be the set point of the relief valve 13.

As pressure builds in the regulation chamber 9, if it exceeds the pressure at the outlet 8, the piston 6 is biased towards an open position (to the right in FIG. 1), i.e. so as to allow flow from the inlet 2 to the outlet 8 by moving the piston apertures 7 into an overlapping position with bore apertures 4. This will cause pressure to rise until the pressure in the outlet 8 balances the pressure in the regulation chamber 9 at which point equilibrium has been reached and the piston 6 ceases to move.

Also within the regulation chamber 9 is a manual override that can be used to control the valve in case of malfunction. The manual override comprises a cam 15 that can be rotated to push the piston 6 towards an open position (i.e. to create overlap of piston apertures 7 and bore apertures 4 so as to cause flow from the inlet 2 to the outlet 8). Although this flow may not be pressure regulated via a control loop in the manual override operation it does allow downstream systems to function.

Figure 2A:
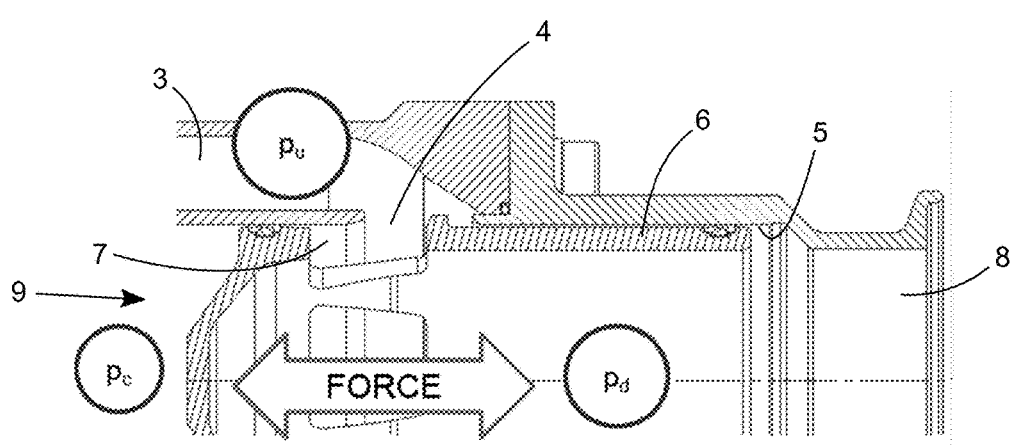
FIGS. 2a, 2b and 2c illustrate the intermediate, fully open and fully closed positions of a typical valve.
Figure 2B:
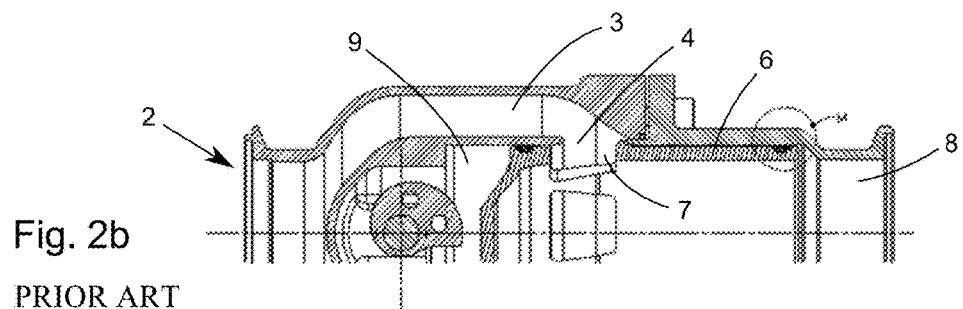
Figure 2C:
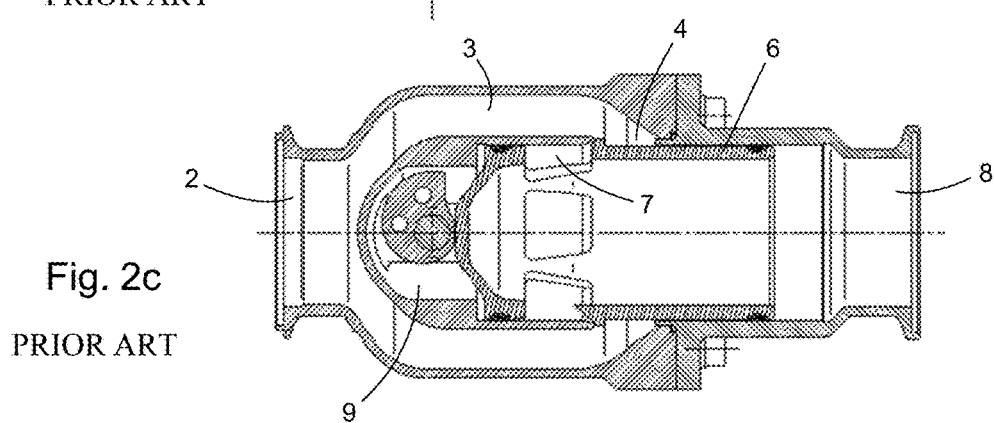

FIGS. 2a, 2b and 2c show the piston in an intermediate position (between fully open and fully closed), fully open position and fully closed position respectively. In the fully open position (FIG. 2b) the piston apertures 7 are maximally aligned with the bore apertures 4. In the fully closed position (FIG. 2c) the piston apertures 7 have no overlap with the bore apertures 4. In this position the only flow from inlet 2 to outlet 8 is by leakage past the seals. It will be appreciated that there is always some such leakage in pneumatic systems in aircraft engine systems because the high gas temperatures (e.g. over 600 degrees C.) prevent the use of rubber or plastic seals. Therefore all seals in the valve are metal seals which suffer some leakage, especially at the high pressures experienced (e.g. over 20 bar).

FIG. 2a also illustrates the force balance across the piston 6. The upstream pressure from the inlet 2 is indicated by pu, the downstream pressure from the outlet 8 is indicated by pd and the regulation chamber pressure is indicated by pc. The arrow 16 shows the force balance across the piston 6 between the downstream pressure pd and the regulation chamber pressure pc and also illustrates the movement of the piston 6 within the bore 5.

Figure 3:
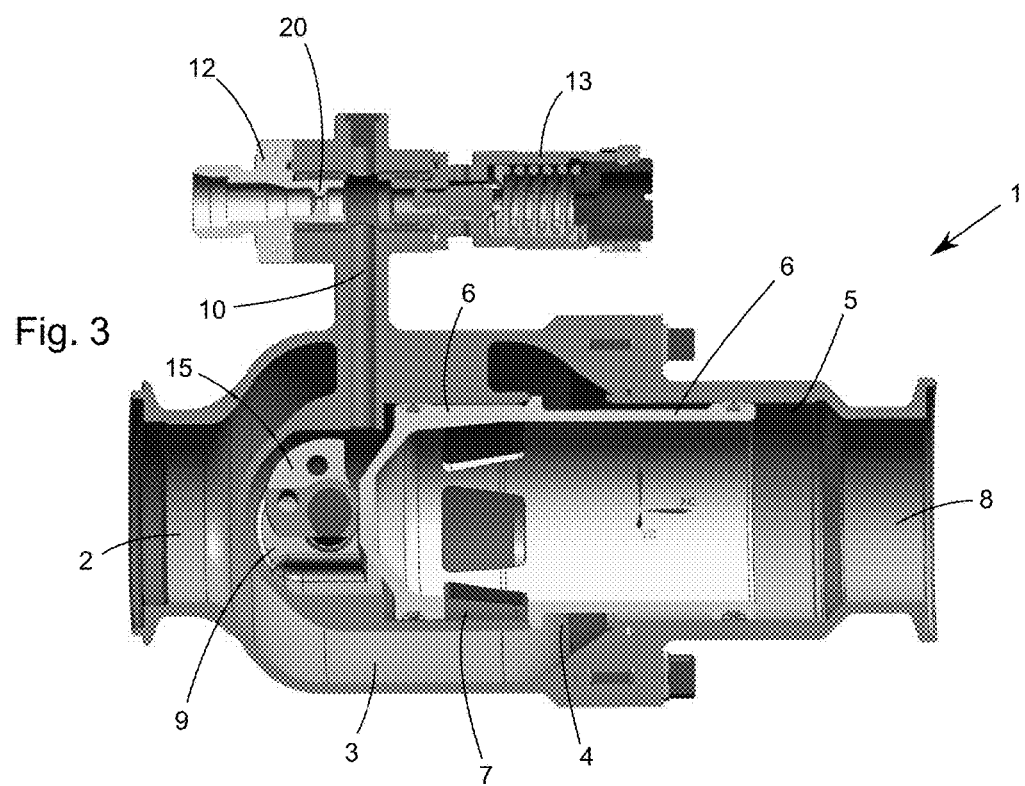
FIG. 3 shows a pressure regulation valve with flow restriction.

FIG. 3 shows a pressure regulation and shut-off valve 1 similar to that of FIG. 1. The majority of the components are the same as in FIG. 1 and therefore only the differences will be described here.

Sense line connector 12 connects the sense line 11 to the main valve body so as to communicate gas at the inlet pressure to the regulation chamber 9. However, whereas connector 1 of the prior art device shown in FIG. 1 has no flow restriction, the connector 12 of the valve 1 shown in FIG. 3 has a flow restriction 20 which decouples the volume of the sense line 11 (not shown, but extending to the left in FIG. 3) from the volume of the pressure regulation chamber 9 and the internal conduit 10 (i.e. the volume to the right of the flow restriction 20 in FIG. 3). The sense line connector 12 and therefore the flow restriction 20 is located close to the connection of the pressure relief valve 13 so as to decouple as much of the sense line volume as possible. The flow restriction 20 is positioned upstream of the connection to the pressure relief valve 13 so that it does not interfere with the fluid communication between the regulation chamber 9 and the pressure relief valve 13. There is therefore no obstruction in the internal conduit 10 that could cause an unwanted reduction in the outlet pressure.

As the flow restriction 20 can be incorporated into the sense line connector 12, existing regulation valves 1 can be modified simply by replacing the sense line connector 12 with a replacement connector 12 incorporating the flow restriction 20. Further, as the only part that needs to be changed is the sense line connector 12, there are minimal modifications required to the tools and assembly for manufacturing the valve 1, thus the cost of the modification is minimal.

As discussed above, and as shown in FIGS. 4 and 5, the sense line 11 is used not only to communicate gas at inlet pressure to the regulation chamber 9, but also to vent the regulation chamber 9 when the valve 1 is to be shut off. It is this venting line 22 connected to a shut-off valve 23, typically operated by a solenoid 24 which can be located at quite a distance from the regulation valve 1. This is particularly the case in aircraft engine systems such as a de-icing system where the solenoid and controls for the shut-off need to be distanced from the heat of the engine.

By isolating the volume of the sense line 11 from the volume of the regulation chamber 9, a large volume sense line 11 (e.g. a long line with a long shut-off line 22 attached) does not result in instability in the operation of valve 1.

Figure 4:
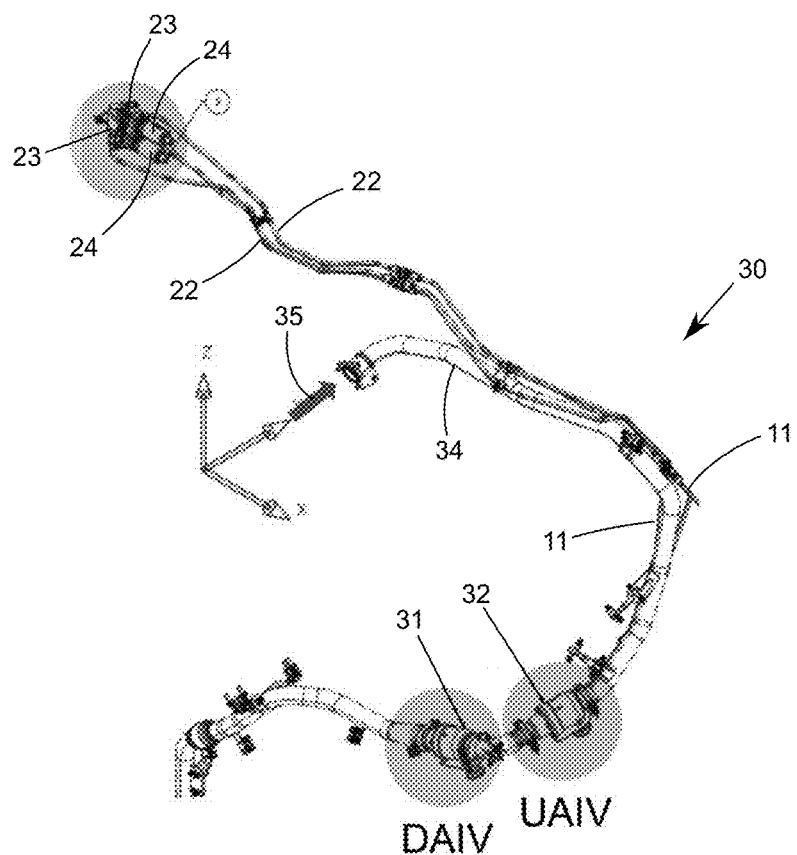
FIG. 4 illustrates the arrangement of two valves in a de-icing system.

FIG. 4 shows a de-icing system 30 for an aircraft gas turbine engine with two pressure regulation valves indicated as DAIV (Downstream Anti-Ice Valve) 31 and UAIV (Upstream Anti-Ice Valve) 32. These two valves 31, 32 are connected in series with the outlet 8 of upstream valve 32 providing the inlet 2 to downstream valve 31 as is illustrated in the schematic diagram of FIG. 5. The outlet 8 of downstream valve 31 is directed to the nacelle lip of the gas turbine engine as indicated by arrow 33. Upstream of the two valves 31, 32 are the inlet pipe 34 that channels hot gas from the engine compressor as indicated by arrow 35, and the two shut-off lines 22 leading to two shut-off solenoids 36 that open and close the shut-off lines 22. The combination of having long sense line volumes with having two pressure regulation valves in series (for redundancy) would result in the above-mentioned pneumatic instability, except that the flow restrictions 20 isolate the long sense lines 11 and shut-off lines 22 from the regulation chamber volume and thus decouple these volumes from the important feedback loops of the valves 31, 32.

The main benefit of the flow restriction 20 is the increased stability margin, which guarantees a stable and smooth operation of the PRSOVs 31, 32. No detrimental effects are present (e.g. there is no inability to open or close the valve, there is no shift in the output regulated pressure, etc.) if the orifice size of the flow restriction 20 is adequately selected in relation to the other pipes and orifices in the system.

The flow restriction 20 provides an orifice of area smaller than the cross-sectional area of the sense line 11 and shut-off line 22 in order to pneumatically decouple the sense-line volume from the regulation chamber volume. The orifice of flow restriction 20 is also smaller in diameter than the cross-sectional diameter of internal conduit 10 which needs to retain a larger flow capability in order not to hinder the valve operation. The flow restriction 20 is a wider orifice than the feeding orifices 37 that feeds gas from the inlet pipe 34 into the sense lines 11, thus allowing a rapid venting to take place in the event that a shut-off command is issued to solenoids 36.

Purely by way of example, in one exemplary de-icing system, a 2 mm orifice can bring a great stability margin improvement for sense lines 11 with an internal diameter of 5 mm or higher. The internal conduit 10 may have a similar diameter to the sense lines 11 (i.e. around 5 mm). The feeding orifices 37 have a diameter of about 0.8 mm.

The invention claimed is:

1. A pneumatic pressure regulation valve comprising: a valve inlet; a valve outlet; a piston arranged to control gas flow from the inlet to the outlet; a sense line fluidly connecting the inlet to a pressure regulation chamber; a pressure relief valve connected to the sense line to limit the pressure in the pressure regulation chamber; wherein the piston is arranged between the pressure regulation chamber and the valve outlet such that the position of the piston is determined by the relative pressures in the regulation chamber and the valve outlet and the position of the piston controls the flow from the valve inlet to the valve outlet; wherein the sense line comprises a flow restriction upstream of the pressure relief valve; and wherein said flow restriction is a wider orifice than an orifice that connects the sense line to the inlet.

2. A pressure regulation valve as claimed in claim 1, wherein said flow restriction decouples the regulation chamber volume from the majority of the sense line volume.

3. A pressure regulation valve as claimed in claim 1, wherein said flow restriction allows venting of the regulation chamber.

4. A pressure regulation valve as claimed in claim 1, wherein the cross-sectional area of said flow restriction is smaller than the cross-sectional area of the sense line upstream of said restriction.

5. A pressure regulation valve as claimed in claim 1, wherein the cross-sectional area of the flow restriction orifice is smaller than the cross-sectional area of a flow path between the pressure relief valve and the regulation chamber.

6. A pressure regulation valve as claimed in claim 1, wherein the cross-sectional area of the flow restriction is greater than 5% of the cross-sectional area of the sense line.

7. A pressure regulation valve as claimed in claim 1, wherein the cross-sectional area of the flow restriction is less than 60% of the cross-sectional area of the sense line.

8. A pressure regulation valve as claimed in claim 1, wherein the volume of the sense line is greater than the volume of the regulation chamber.

9. A pressure regulation valve as claimed in claim 8, wherein the volume of the sense line is at least twice as large as the volume of the regulation chamber.

10. A pressure regulation valve as claimed in claim 1, further comprising a valve upstream of the flow restriction which, when opened, vents the regulation chamber through the sense line.

11. A de-icing system for an aircraft engine comprising a first pressure regulation valve as claimed in claim 1.

12. A de-icing system for an aircraft engine as claimed in claim 11 further comprising a second pressure regulation valve as claimed in claim 1, in series with the first pressure regulation valve.

13. A method of regulating pneumatic pressure at an outlet comprising: diverting a portion of gas from an inlet through a sense line and past a pressure relief valve to a regulation chamber; providing a piston between the pressure regulation chamber and the outlet such that the position of the piston is determined by the relative pressures in the regulation chamber and the outlet and the position of the piston controls gas flow from the inlet to the outlet; wherein the sense line comprises a flow restriction upstream of the pressure relief valve, wherein said flow restriction is a wider orifice than an orifice that connects the sense line to the inlet.

* * * * *